(12) United States Patent
Tsirkin (10) Patent No.: US 10,255,088 B2
(45) Date of Patent: Apr. 9, 2019

(54) MODIFICATION OF WRITE-PROTECTED MEMORY USING CODE PATCHING

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 229 days.

(21) Appl. No.: 15/154,661

(22) Filed: May 13, 2016

(65) Prior Publication Data

US 2017/0329618 A1    Nov. 16, 2017

(51) Int. Cl.
```
G06F 9/455      (2018.01)
G06F 12/1009    (2016.01)
G06F 12/109     (2016.01)
G06F 8/65       (2018.01)
G06F 12/14      (2006.01)
```

(52) U.S. Cl.
CPC .............. G06F 9/4555 (2013.01); G06F 8/65 (2013.01); G06F 9/45558 (2013.01); G06F 12/109 (2013.01); G06F 12/1009 (2013.01); G06F 12/1475 (2013.01); *G06F 2009/45583* (2013.01); *G06F 2212/1052* (2013.01); *G06F 2212/152* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,213,125 B2 | 5/2007 | de Dinechin et al. | |
| 8,006,043 B2 | 8/2011 | Agesen | |
| 8,584,254 B2 | 11/2013 | Cui et al. | |
| 8,607,208 B1 * | 12/2013 | Arnold | G06F 8/67 717/129 |
| 8,875,295 B2 | 10/2014 | Lutas et al. | |
| 2004/0107416 A1 * | 6/2004 | Buban | G06F 8/67 717/170 |

(Continued)

OTHER PUBLICATIONS

Scott Brookes, Robert Denz, Martin Osterloh, Stephen Taylor, *ExOShim: Preventing Memory Disclosure using Execute-Only Kernel Code*, Thayer School of Engineering at Dartmouth College TR15-001, http://thayer.dartmouth.edu/tr/reports/tr15-001.pdf, published 2015, 11 pages.

(Continued)

*Primary Examiner* — Diem K Cao
(74) *Attorney, Agent, or Firm* — Haynes and Boone, LLP (57) ABSTRACT

Systems and methods are provided for modifying a set of memory pages. An example method includes loading kernel code and patching code of a kernel into a guest memory. The patching code is stored at a first range of memory addresses, which is in an executable mode in a first set of hypervisor page tables. The method also includes detecting a demand to modify a set of memory pages and sending a request to the hypervisor to transfer control to the patching code in response to detecting the demand. The hypervisor may switch from the first set of hypervisor page tables to a second set of hypervisor page tables in response to detecting a request to transfer control to the patching code. The set of memory pages is write-protected in the second set of hypervisor page tables, and is writable in the first set of hypervisor page tables.

20 Claims, 7 Drawing Sheets

(56) References Cited

U.S. PATENT DOCUMENTS

| | | | | |
|---|---|---|---|---|
| 2006/0010440 | A1* | 1/2006 | Anderson | G06F 9/45533 |
| | | | | 718/1 |
| 2006/0026385 | A1* | 2/2006 | Dinechin | G06F 12/1036 |
| | | | | 711/210 |
| 2006/0036830 | A1 | 2/2006 | Dinechin et al. | |
| 2013/0086299 | A1* | 4/2013 | Epstein | G06F 12/1475 |
| | | | | 711/6 |
| 2015/0278106 | A1* | 10/2015 | Gschwind | G06F 12/10 |
| | | | | 711/202 |
| 2015/0379265 | A1 | 12/2015 | Lutas et al. | |
| 2017/0213039 | A1* | 7/2017 | Werner | G06F 21/53 |

OTHER PUBLICATIONS

Owen S. Hofmann, Alan M. Dunn, Sangman Kim, Indrajit Roy, Emmett Witchei, *Ensuring Operating System Kernel Integrity with OSck*, Mar. 5-11, 2011, https://www.cs.utexas.edu/~sangmank/pubs/osck.pdf , 12 pages.

Siarhei Liakh, Michael Grace, Xuxian Jiang, *Analyzing and Improving Linux Kernel Memory Protection: A Model Checking Approach*, Dec. 6-10, 2010, North Carolina State University, http://www4.ncsu.edu/~mcgrace/ACSAC10.pdf, 10 pages.

Zhi Wang, Xuxian Jiang, Weidong Cui, Peng Ning, *Countering Kernel Rootkits with Lightweight Hook Protection*, Nov. 9-13, 2009, NC State University; Microsoft Research, http://www.msr-waypoint.com/pubs/153178/hooksafe-ccs09.pdf, 10 pages.

* cited by examiner

MODIFICATION OF WRITE-PROTECTED MEMORY USING CODE PATCHING

BACKGROUND

The present disclosure generally relates to computing devices, and more particularly to handling a request to modify write-protected memory.

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each virtual machine guest operating system may be accessed by one or more local or remote clients to perform computing tasks.

BRIEF SUMMARY

Methods, systems, and techniques for modifying a set of memory pages set to a write-protected mode are provided.

An example method of modifying a set of memory pages includes loading, by a guest running on a virtual machine, kernel code and patching code of a kernel into a guest memory allocated to the guest. The patching code corresponds to a first set of hypervisor page tables, and the kernel code corresponds to a second set of hypervisor page tables. The method also includes sending a message indicating that a first range of memory addresses is associated with the first set of hypervisor page tables to a hypervisor. The patching code is stored at the first range of memory addresses. The first range of memory addresses is in an executable mode in the first set of hypervisor page tables. The method further includes executing the patching code. Execution of the patching code includes: identifying a request to modify a set of memory pages, modifying the set of memory pages in accordance with the request, and after the set of memory pages is modified in accordance with the request, sending a request to the hypervisor to transfer control to the kernel code. The set of memory pages is in a writable mode in the first set of hypervisor page tables and in a write-protected mode in the second set of hypervisor page tables An example system for modifying a set of memory pages includes a guest memory storing kernel code and patching code of a kernel. The system also includes a hypervisor memory storing first and second sets of hypervisor page tables. The system further includes a guest that loads the kernel code and patching code into the guest memory, sends a message indicating that a first range of memory addresses is associated with the first set of hypervisor page tables, detects a demand to modify the set of memory pages, sends a request to transfer control to the patching code in response to detecting the demand, and executes the patching code. The patching code is stored at the first range of memory addresses. The first range of memory addresses is in an executable mode in the first set of hypervisor page tables. At most one of the first set of hypervisor page tables and the second set of hypervisor page tables is active at a time for each guest virtual processor. Each guest virtual processor is restricted by the access permissions specified in the active hypervisor page table. The first set of hypervisor page tables is active while the patching code controls a virtual processor exposed to the guest. The second set of hypervisor page tables is active while the kernel code controls a virtual processor exposed to the guest. The system also includes a hypervisor that in response to detecting a request to transfer control to the patching code, switches the guest from the first set of hypervisor page tables to the second set of hypervisor page tables and transfers control to the guest. The set of memory pages is in a writable mode in the first set of hypervisor page tables and in a write-protected mode in the second set of hypervisor page tables.

An example non-transitory machine-readable medium includes a plurality of machine-readable instructions that when executed by one or more processors are adapted to cause the one or more processors to perform a method including: loading, by a guest running on a virtual machine, kernel code and patching code of a kernel into a guest memory allocated to the guest, the patching code corresponding to a first set of hypervisor page tables, and the kernel code corresponding to a second set of hypervisor page tables; sending a message indicating that a first range of memory addresses is associated with the first set of hypervisor page tables to a hypervisor, the patching code being stored at the first range of memory addresses, and the first range of memory addresses being in an executable mode in the first set of hypervisor page tables; and executing, by the guest, the patching code, where execution of the patching code includes: identifying a request to modify a set of memory pages; modifying the set of memory pages in accordance with the request; and after the set of memory pages is modified in accordance with the request, sending a request to the hypervisor to transfer control to the kernel code, where the set of memory pages is in a writable mode in the first set of hypervisor page tables and in a write-protected mode in the second set of hypervisor page tables.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A process having supervisor or kernel privileges (e.g., ring 0 for x86 processor architecture family) may be able to modify any memory in the system, including kernel code. The process may exploit kernel code, remove write protection from memory pages of the kernel, and potentially escalate the exploit to other parts of the kernel. To reduce security vulnerabilities, some processor technologies support preventing the modification of instructions stored at specific memory locations. For example, some processor technologies support write protection of executable code. A memory page that is set to a write-protected mode is not modifiable while the memory page is set to such a mode, and may be made more secure by setting it to the write-protected mode. A memory page in the write-protected mode may also be referred to as a write-protected memory page or a non-modifiable memory page.

It may be desirable to modify memory that is write-protected for various reasons. For example, it may be desirable to modify write-protected kernel code to enable debugging (e.g., tracing or inserting break points) or to use one or more jump labels. A jump label is an optimization technology that is self-modifying code (code that modifies itself). A memory page that is set to a writeable mode is modifiable while the memory page is set to such a mode. A memory page in the writeable mode may also be referred to as a writeable memory page or a modifiable memory page.

One way to modify a set of write-protected memory pages is to remove the write protection from the set, modify the set, and reinforce the write protection at a later point in time. Accordingly, when a request to modify the set of write-protected memory pages is received, write permission to this set may be temporarily enabled and disabled. In an example, an operating system (OS) sets a set of write-protected memory pages currently in the write-protected mode to the writeable mode. Accordingly, the set of write-protected memory pages that was previously in the write-protected mode now becomes modifiable. After the set of write-protected memory pages has been modified, the OS may set the set of memory pages back to the write-protected mode. In this example, the OS may include the functionality to enable and disable write-protection. Unfortunately, if malicious code is executed in the OS, the malicious code may jump to the memory address storing this functionality within the OS and execute the code that removes write protection from write-protected memory pages. Accordingly, write-protected memory may be tampered with, leading to security risks.

With the use of virtualization technology, another way to modify a set of write-protected memory pages is for the hypervisor to remove write protection from the set by setting its permissions in the hypervisor's page tables, which may also be referred to as Extended Page Tables (EPT). In this example, a guest OS may be unable to remove this write protection from the set of memory pages because the guest OS is unable to access the EPT. Accordingly, this technique may reduce the amount of damage caused by a kernel-level OS exploit. To modify the set of write-protected memory pages, the hypervisor may modify this set on behalf of the guest OS. Unfortunately, this technique may involve exposing a rich and complex interface to the guest OS through which it can modify the set of memory pages through the hypervisor.

Additionally, both of the above examples protect memory at page granularity. In these examples, to modify a memory page, the memory page is temporarily set to the writable mode, and during this window malicious code may be able to modify unrelated data in the same memory page. A similar problem occurs with protecting guest page table memory because multiple page table entries reside in the same memory page. For example, to modify a page table entry in a page table, the hypervisor may remove the write protection from the memory page storing the page table and modify the particular page table entry. During this window, malicious code may be able to modify unrelated data in the same memory page.

The present disclose provides techniques to securely modify one or more write-protected memory pages. Unless specifically stated otherwise, as apparent from the following discussion, it is appreciated that throughout the description, discussions utilizing terms such as "determining," "storing," "detecting," "receiving," "sending," "loading," "executing," "identifying," "modifying," "transferring," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
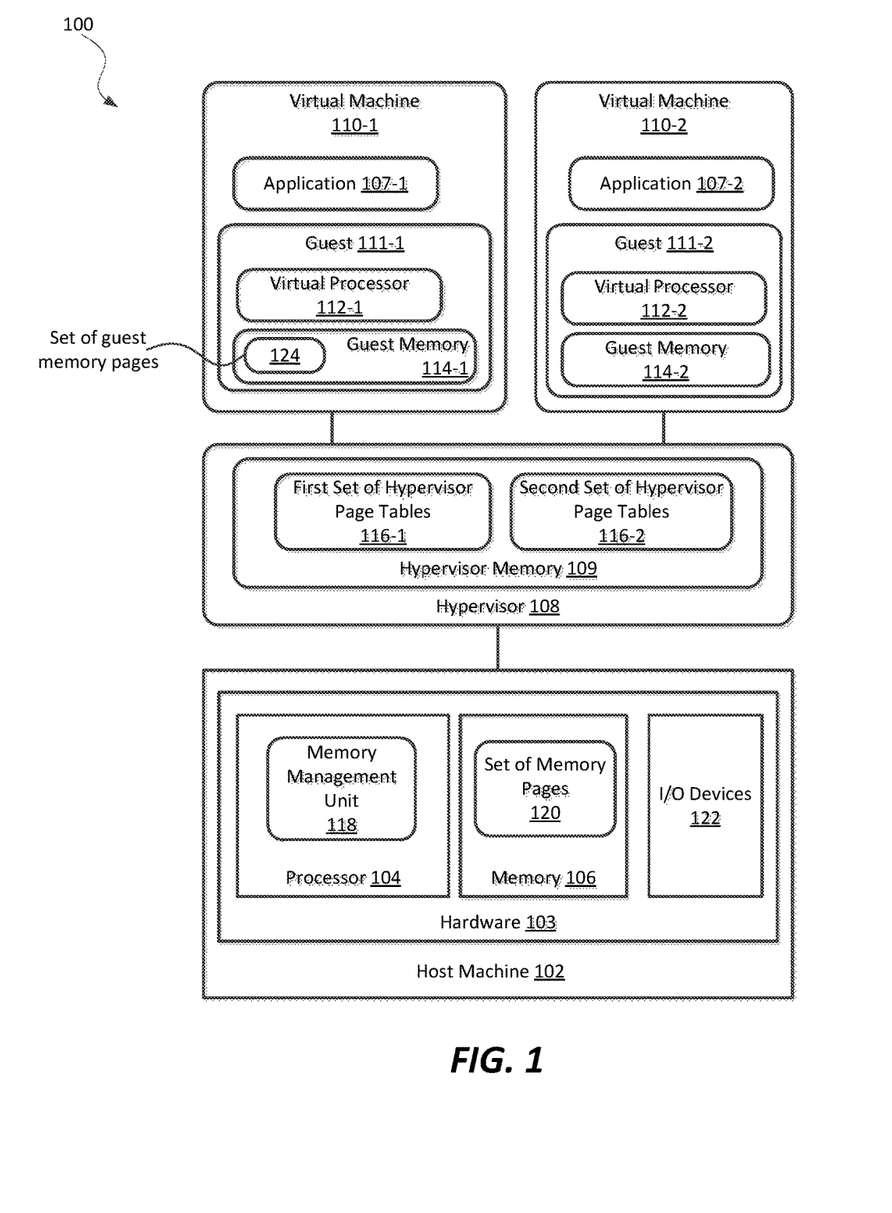
FIG. 1 is an example diagram showing a host system.

FIG. 1 is an example diagram showing an illustrative host system 100. According to the present example, a physical system, such as host machine 102 includes hardware 103 such as processor 104 for executing software (e.g., machine-readable instructions) and using or updating data stored in memory 106. Hardware 103 may include more than one processor 104. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system, a hypervisor 108, and various other software applications. Hardware 103 may include other I/O devices 122.

Host machine 102 may be coupled over a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Host machine 102 may run one or more virtual machines that run applications 107 and services. A hypervisor 108 manages resources of host machine 102 and makes them available to one or more guests that may be alternately or concurrently executed by host machine 102. Hypervisor 108 may manage hardware resources and arbitrate requests of the multiple guests. For example, hypervisor 108 may present a virtual set of processors, memory, input/output (I/O), and disk resources to each guest based on the physical hardware and/or based on a standard and consistent selection of custom hardware. A virtual machine is provided its own address space in memory, its own processor resource allocation, and its own device I/O using its own virtual devices.

Virtual machines 110 are platforms on which OSs referred to as guest OSs run. A guest OS may be referred to as a "guest." A guest 111-1 running on the first virtual machine 110-1 may be a different OS than guest 111-2 running on the second virtual machine 110-2. A guest may also be a different OS than the OS running on host machine 102. In the example illustrated in FIG. 1, hypervisor 108 supports a first virtual machine 110-1 having a first virtual processor 112-1 and a first guest memory 114-1. Hypervisor 108 also supports a second virtual machine 110-2 having a second virtual processor 112-2 and a second guest memory 114-2. Although two virtual machines 110 are illustrated, host system 100 may include fewer than or more than two virtual machines.

The hardware resources of host machine 102 are shared among hypervisor 108 and one or more guests. Hypervisor 108 may map a virtual resource or state (e.g., registers, memory, or files) to resources in the underlying host machine 102. A guest 111-1, 111-2 may execute one or more applications 107-1, 107-2 that use resources of host machine 102. Kernel 206 may be accessed by an application running on guest 111 through the use of system calls. Kernel 206 abstracts components of hardware on a high level such that an application may send a request that is processed by a hardware device without knowing the fine details of the hardware device. To interact with a hardware device, the application may invoke a system call into kernel 206. For example, an application may send an I/O request to kernel 206 via a system call to request that a particular hardware device perform a particular action. A system call may refer to a request by an active process for a service performed by kernel 206. An example request may be a write request to one or more memory pages. An active process is a process that is currently processing in processor 104, as contrasted with a process that is waiting for its next turn in processor 104. I/O may be any program, operation, or device that transfers data to or from processor 104 and to or from a hardware device (e.g., disk drives, keyboards, mice, and printers). In another example, guest 111 invokes a hypercall that causes the hypervisor to set permissions of a set of memory pages corresponding to memory allocated to the guest to a particular mode (e.g., write-protected mode, writeable mode, etc.).

An application may have one or more processes executing on host machine 102. A process is an executing instance of a program. A guest may use a memory management technique called virtual memory, which maps virtual addresses used by an application into physical addresses in memory 106. Processor 104 includes a memory management unit (MMU) 118 that supports the use of virtual memory. With MMU 118, memory addresses may go through a translation step from a virtual address to a physical address prior to each memory access.

In a virtual memory system, the addresses seen by user programs do not directly correspond to the physical addresses used by the hardware. Hypervisor 108 presents guest memory 114-1 to virtual machine 110-1 and presents guest memory 114-2 to virtual machine 110-2. Hypervisor 108 maps guest physical memory addresses of guest memory 114 to host physical memory addresses of memory 106 using page tables. Host physical memory refers to the memory that is visible by hypervisor 108 as available on the system. Guest physical memory refers to the memory that is visible to the guest running in the virtual machine and is backed by host physical memory. Hypervisor 108 may sit between the guest physical memory and MMU 118 on processor 104. Memory 106 may include random access memory (RAM), and MMU 118 may divide the RAM into pages. A page is a contiguous section of memory of a set size that is handled by MMU 118 as a single entity. Guest virtual memory refers to a continuous virtual address space presented by the guest to one or more applications. The guest may present a virtual address space to the applications running on the guest. Guest virtual memory is visible to the applications running inside the virtual machine.

Virtual memory addresses may be mapped to physical memory addresses using one or more data structures. A data structure may be a page table. A page table may be a guest page table or a hypervisor page table. A guest page table is a data structure in virtual memory that stores mappings between the guest virtual addresses and the guest physical addresses. Hypervisor 108 includes a hypervisor memory 109 that stores data maintained by the hypervisor. Hypervisor memory 109 includes a set of hypervisor page tables 116-1, 116-2. A hypervisor page table is a data structure in hypervisor memory 109 that stores mappings between the guest physical addresses of guest memory 114 and the host physical addresses of memory 106. A hypervisor page table may also be referred to as an Extended Page Table (EPT). In some examples, hypervisor 108 maintains the virtual-to-physical page mappings in a set of shadow page tables. In some examples, a hypervisor page table may refer to a hypervisor data structure from which the hypervisor constructs the EPTs or the shadow page tables.

Additionally, a hypervisor page table may store access permissions for one or more memory pages (e.g., in guest memory 114). Examples of access permission modes are read-only, write-only, write-protected (e.g., read-execute only), read-write only, and read-write-execute only. In the example illustrated in FIG. 1, first set of hypervisor page tables 116-1 or second set of hypervisor page tables 116-2 may include one or more page table entries, where a page table entry specifies a guest memory page allocated to a guest and the access permissions of the guest memory page. A page table entry may have a permission bit indicating whether the memory page is writable, a permission bit indicating whether the memory page is readable, and a permission bit indicating whether the memory page is executable. In the present disclosure, if a range of memory addresses is in a particular mode (e.g., write-protected mode) in a set of hypervisor page tables, then the memory pages located within the range of memory addresses are also in the particular mode (e.g., write-protected mode). If a memory page is executable in the EPT, the memory page might not be executable in the guest because the guest can remove execute permission.

Guest memory 114 includes a set of guest memory pages 124. In an example, hypervisor 108 sets set of guest memory pages 124 to the writable mode in a hypervisor page table. In this example, set of guest memory pages 124 is modifiable. Accordingly, an entity (e.g., application or guest) is able to modify set of guest memory pages 124, and may be able to read or execute set of guest memory pages 124 depending on whether the access permissions allow such an access. In another example, hypervisor 108 sets set of guest memory pages 124 to the write-protected mode in a hypervisor page table. In this example, set of guest memory pages 124 is not modifiable. Hypervisor 108 may set the set of guest memory pages 124 to the write-protected mode to prevent modification of the set of guest memory pages. Accordingly, an entity is unable to modify set of guest memory pages 124, but may be able to read or execute set of guest memory pages 124 depending on whether the access permissions allow such an access. Set of guest memory pages 124 may store, for example, patching code 204 or guest page tables.

In another example, hypervisor 108 sets the set of guest memory pages 124 to the read-only mode in a hypervisor page table. Accordingly, an entity is able to read set of guest memory pages 124, but is unable to modify or execute the set of guest memory pages. In another example, hypervisor 108 sets the set of guest memory pages 124 to the read-write mode in a hypervisor page table. In this example, set of guest memory pages 124 is readable and modifiable while in the read-write mode. Accordingly, an entity is able to read from and write to set of guest memory pages 124, and may be able to execute set of guest memory pages 124 depending on whether the access permissions allow such an access.

Figure 2:
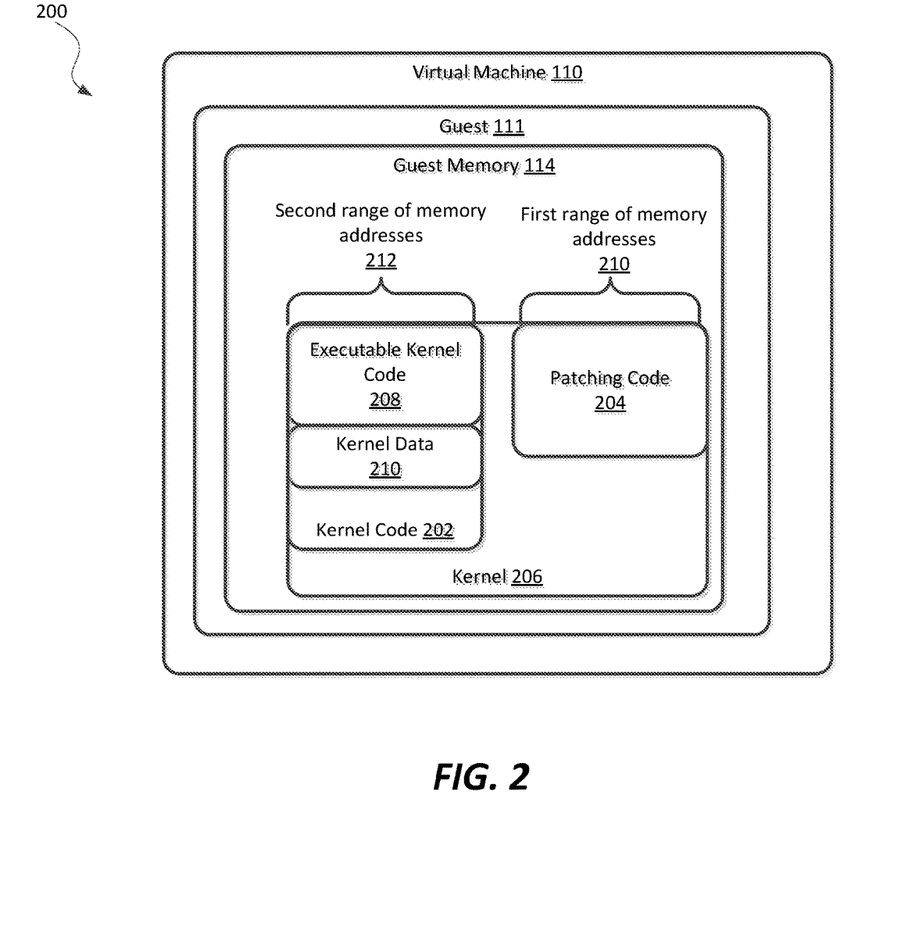
FIG. 2 is an example block diagram illustrating a system for securing the modification of one or more write-protected memory pages.

In some examples, it may be desirable to modify write-protected memory in a secure fashion. The present disclosure provides techniques for securing the modification of one or more of these write-protected memory pages. FIG. 2 is an example block diagram 200 illustrating a system for securing the modification of one or more write-protected memory pages. Although the description below may describe the write-protected memory pages as being guest memory pages, it should be understood that the write-protected memory pages may be host memory pages or hypervisor memory pages.

In the example illustrated in FIG. 2, guest 111 runs on virtual machine 110 and includes guest memory 114. Guest memory 114 includes a kernel 206 that serves as an intermediary between hardware and software (e.g., an application running on guest 111). Kernel 206 includes kernel code 202, which includes executable kernel code 208 and kernel data 210, and patching code 204. Patching code 204 may be granted special permissions to modify write-protected memory, while other code is denied such access. In some examples, executable kernel code 208, kernel data 210, and/or a set of guest page tables (not shown) are write-protected. For added security, patching code 204 may also be write-protected so that it cannot be modified. Patching code 204 may modify write-protected memory and be used to execute patching on behalf of the rest of the guest. Although patching code 204 is shown as being part of kernel 206, it should also be understood that patching code 204 may be separate from kernel 206.

In the example illustrated in FIG. 2, patching code 204 is stored at a first range of memory addresses 210 in guest memory 114, and kernel code 202 is stored at a second range of memory addresses 212 in guest memory 114. First set of hypervisor page tables 116-1 and second set of hypervisor page tables 116-2 may be mutually exclusive and stored in separate memory regions from each other. Patching code 204 may be kept separate from kernel code 202 so that if kernel code 202 is compromised, it will still be difficult for the attacker to modify write-protected guest memory. In an example, patching code 204 is marked with a special compiler or linker attribute, and is placed in a separate text modifying section in the kernel executable. Guest 111 may be partitioned such that a first portion of guest memory 114 (e.g., kernel code 202) may be modified by a second portion of guest memory 114 (e.g., patching code 204), but only if second portion of guest memory 114 is performing the modification. In this way, write protection may be removed or enforced from within guest 111.

Referring back to FIG. 1, in some examples, at most one of first set of hypervisor page tables 116-1 and second set of hypervisor page tables 116-2 is active at any one time for each guest virtual processor. Hypervisor 108 may allow guest 111 to switch between first set of hypervisor page tables 116-1 and second set of hypervisor page tables 116-2. Each guest virtual processor is restricted by the access permissions specified in the active hypervisor page table. In an example, guest 111 performs operations on memory pages based on the permission bits in the active hypervisor page table. In keeping with the above examples, after control is transferred to patching code 204, first set of hypervisor page tables 116-1 is active. Additionally, after control is transferred to kernel code 202, second set of hypervisor page tables 116-2 is active.

Figure 3:
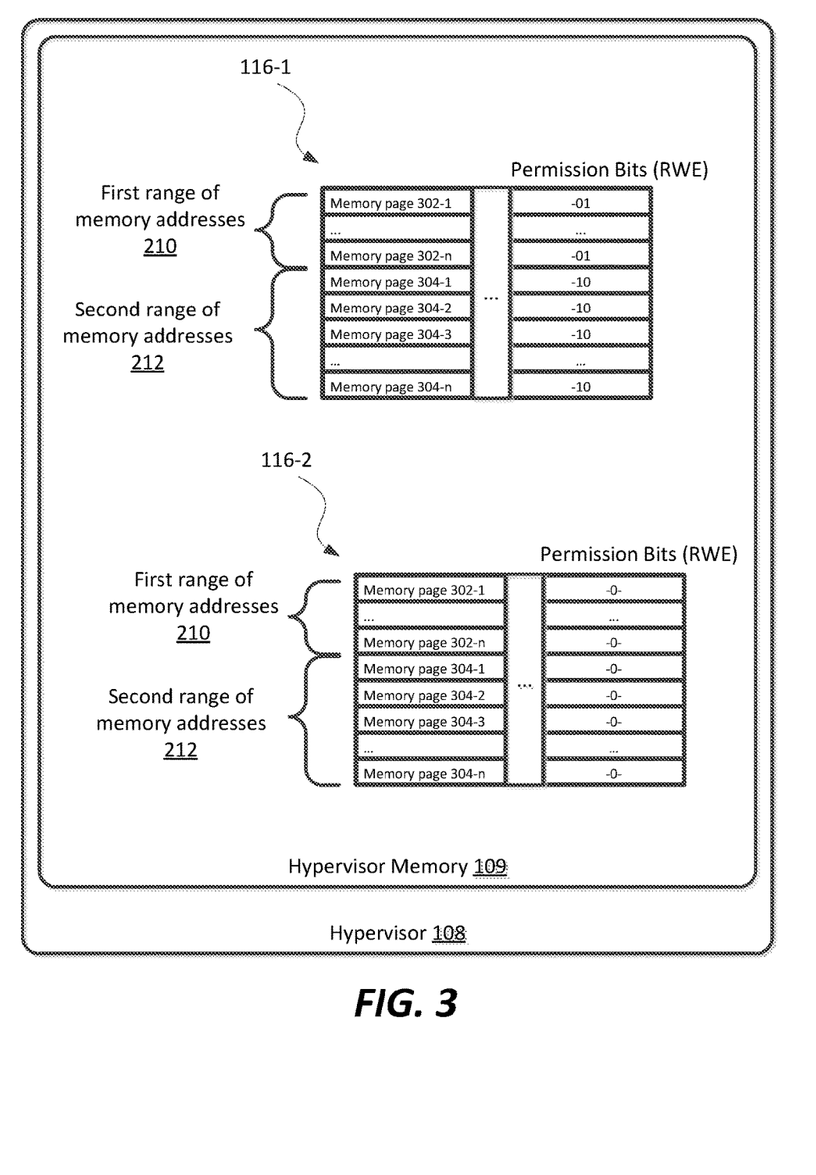
FIG. 3 is an example of a first set of hypervisor page tables and a second set of hypervisor page tables.

FIG. 3 is an example of first set of hypervisor page tables 116-1 and second set of hypervisor page tables 116-2. In FIG. 3, memory pages 302-1, . . . , and 302-n correspond to first range of memory addresses 210, which stores patching code 204, and memory pages 304-1, 304-2, 304-3, . . . , and 304-n correspond to second range of memory addresses 212, which stores kernel code 202. Additionally, a page table entry includes a memory page location along with its access permissions. The access permission bits may be in a read, write, and execute (RWE) order. A "1" bit value may indicate that the corresponding permission is allowed, a "0" bit value may indicate that the corresponding permission is prohibited, and "-" may indicate that the corresponding permission does not matter. It should be understood, however, that in other examples, the "0" bit value may indicate that the corresponding permission is allowed, and the "1" bit value may indicate that the corresponding permission is prohibited.

In FIG. 3, in first set of hypervisor page tables 116-1, memory pages 302-1, . . . , and 302-n are set to the readable, non-writable, and executable permissions, and memory pages 304-1, 304-2, 304-3, . . . , and 304-n are set to the readable, writable, and non-executable permissions. Additionally, in second set of hypervisor page tables 116-2, memory pages 302-1, . . . , and 302-n are set to the readable, non-writable, and executable permissions, and memory pages 304-1, 304-2, 304-3, . . . , and 304-n are set to the readable, non-writable, and executable permissions. In some examples, memory pages 302-1, . . . , 302-n are set to the non-executable permissions. It may be desirable for hypervisor 108 to switch between these two sets of hypervisor page tables. If first set of hypervisor page tables 116-1 is active, patching code 204 is executable (but non-modifiable) and kernel code 202 is modifiable (but not executable). If second set of hypervisor page tables 116-2 is active, patching code 204 and kernel code 202 are non-modifiable. If hypervisor 108 switches control from a first set of page tables to a second set of page tables, then the second set of page tables is active. In an example, second set of hypervisor page tables 116-2 is active. In this example, if hypervisor 108 switches control from second set of hypervisor page tables 116-2 to first set of hypervisor page tables 116-1, memory that was write-protected in accordance with second set of hypervisor page tables 116-2 becomes modifiable in accordance with first set of hypervisor page tables 116-1. After the appropriate memory page(s) is/are modified, hypervisor 108 may then switch control back to second set of hypervisor page tables 116-2 so that it is active.

In an example, hypervisor 108 maintains a page table pointer that points to the active hypervisor page table. If hypervisor 108's page table pointer points to first set of hypervisor page tables 116-1, then first set of hypervisor page tables 116-1 is active. Similarly, if hypervisor 108's page table pointer points to second set of hypervisor page tables 116-2, then second set of hypervisor page tables 116-2 is active. Hypervisor 108 may modify its page table pointer to switch from pointing to first set of hypervisor page tables 116-1 to second set of hypervisor page tables 116-2, and vice versa.

Figure 4A:
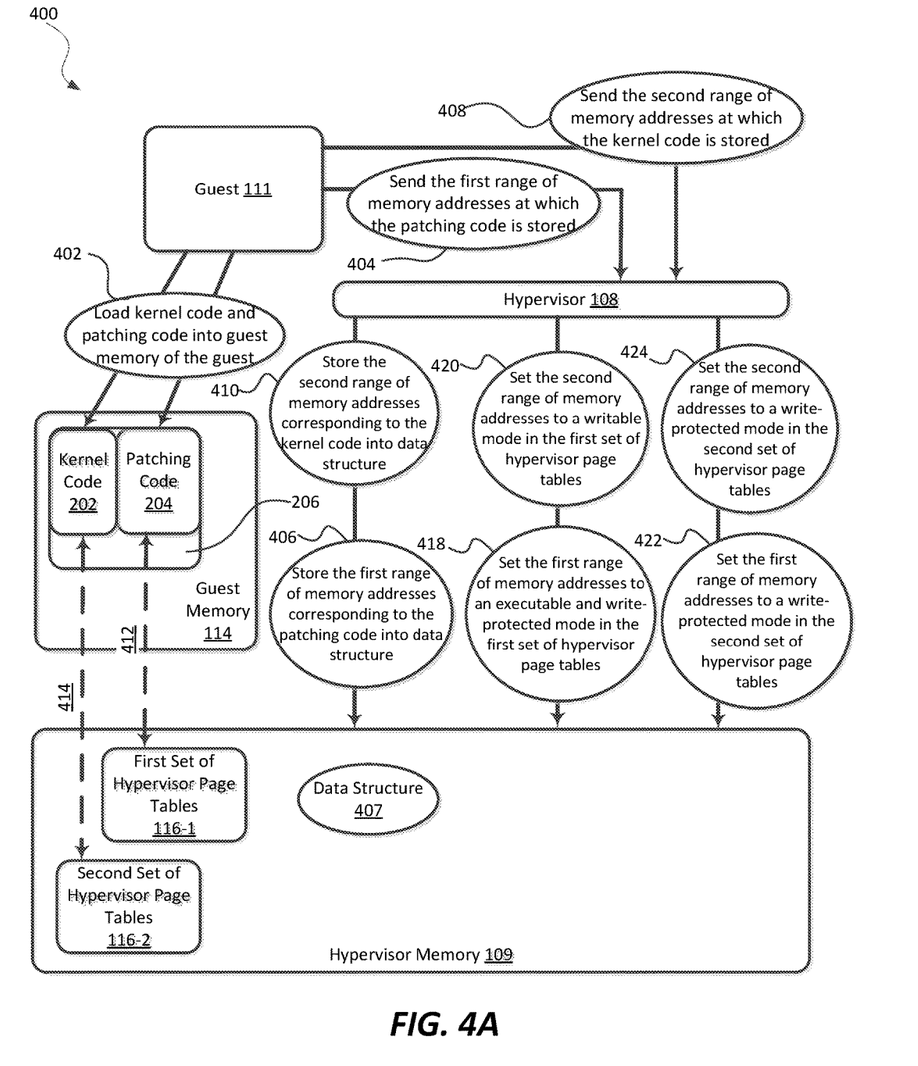
FIGS. 4A and 4B are example process flows illustrating the modification of one or more write-protected memory pages.
Figure 4B:
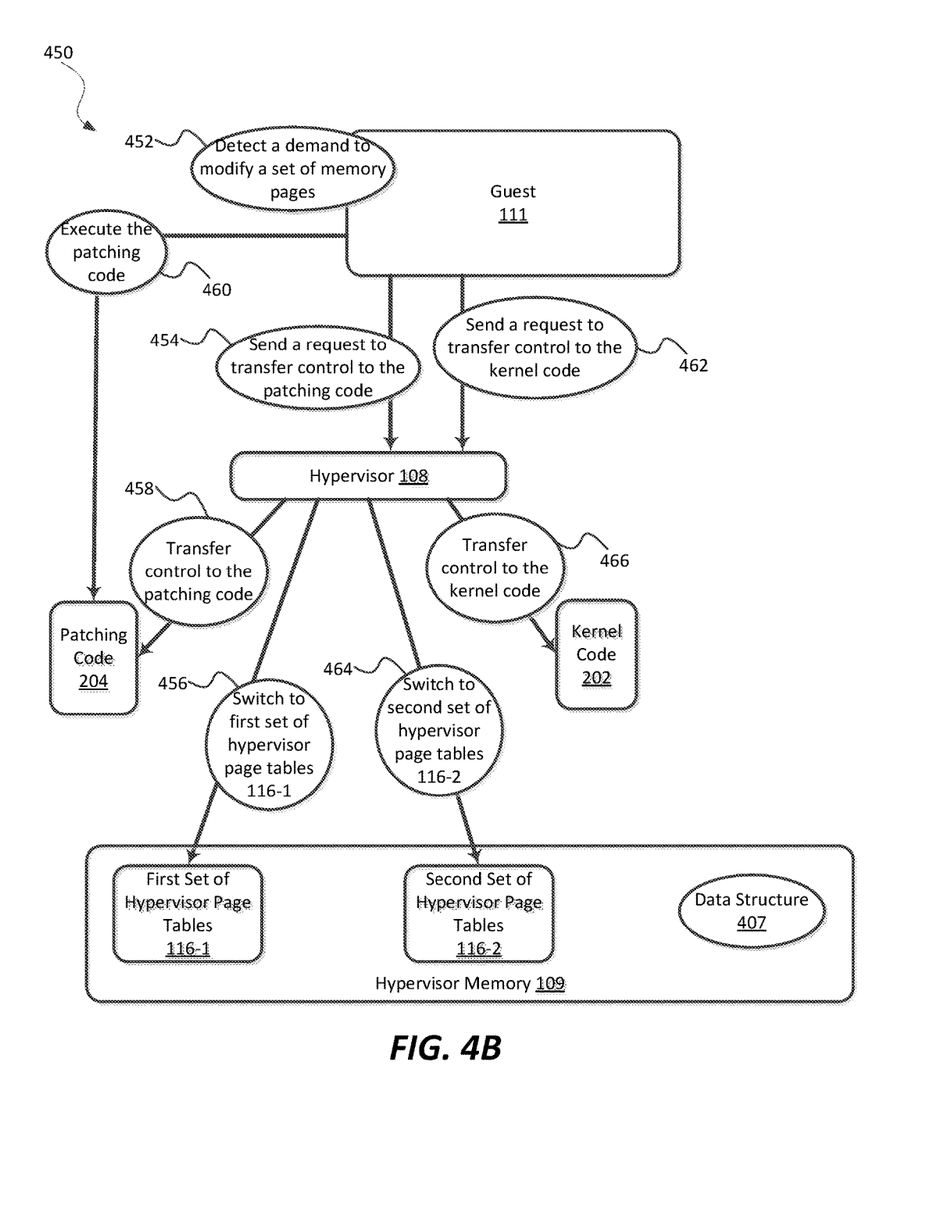

FIGS. 4A and 4B are example process flows 400, 450 illustrating the modification by patching code 204 of one or more write-protected memory pages. In FIG. 4A, at an action 402, guest 111 loads kernel code 202 and patching code 204 into guest memory 114 of guest 111. Referring back to FIG. 2, patching code 204 is stored at first range of memory addresses 210, and kernel code 202 is stored at second range of memory addresses 212. It should be understood that guest 111 may first load kernel code 202 and then load patching code 204 into guest memory 114, may first load patching code 204 and then kernel code 202 into guest memory 114, or may interleave the loading of kernel code 202 and patching code 204 (e.g., loading at least a portion of kernel code 202 and cease loading kernel code 202, then loading at least a portion of patching code 204 and cease loading patching code 204, etc.). In an example, guest 111 loads patching code 204 into a separate page-aligned memory region. Patching code 204 may be page aligned to a specific page size.

At an action 404, guest 111 sends first range of memory addresses 210, which stores patching code 204, to hypervisor 108. In an example, guest 111 sends a message indicating that a first range of memory addresses 210 is associated with the first set of hypervisor page tables to hypervisor 108. Patching code 204 is code within guest 111 that has access to guest memory 114 and is able to modify memory that is in the write-protected mode as specified in second set of hypervisor page tables 116-2 (see FIG. 3). In an example, patching code 204 is provided with extra privileges for accessing guest memory 114 via first set of hypervisor page tables 116-1. Accordingly, it may be unnecessary for a new rich interface to be provided between guest 111 and hypervisor 108. Hypervisor 108 may receive first range of memory addresses 210 and determine that patching code 204 stored at first range of memory addresses 210 is associated with first set of hypervisor page tables 116-1. At an action 406, hypervisor 108 stores first range of memory addresses 210 into a data structure 407 and specifies in the data structure that patching code 204 is stored at first range of memory addresses 210. In some examples, guest 111 sends a message indicating that patching code 204 stored at first range of memory addresses 210 is associated with first set of hypervisor page tables 116-1.

At an action 408, guest 111 sends second range of memory addresses 212, which stores kernel code 202, to hypervisor 108. In an example, guest 111 sends a message indicating that second range of memory addresses 212 is associated with second set of hypervisor page tables 116-2 to hypervisor 108. Kernel code 202 is code within guest 111 and includes executable kernel code 208 and kernel data 210. Hypervisor 108 may receive second range of memory addresses 212 and determine that kernel code 202 stored at second range of memory addresses 212 is associated with second set of hypervisor page tables 116-2. At an action 410, hypervisor 108 stores second range of memory addresses 212 into data structure 407 and specifies in the data structure that kernel code 202 is stored at second range of memory addresses 212. In some examples, guest 111 sends a message indicating that kernel code 202 stored at second range of memory addresses 212 is associated with second set of hypervisor page tables 116-2.

Hypervisor 108 may retrieve second range of memory addresses 212, which stores kernel code 202, in a variety of ways. In an example, guest 111 sends second range of memory addresses 212 to hypervisor 108 and specifies that second range of memory addresses 212 is associated with second set of hypervisor page tables 116-2. Guest 111 may send second range of memory addresses 212 in the same or different communication in which guest 111 sends first range of memory addresses 210 to hypervisor 108. In another example, MMU 118 provides hypervisor 108 with the second range of memory addresses 212 storing kernel code 202. In an example, hypervisor 108 may associate all guest memory that is not associated with first set of hypervisor page tables 116-1 (e.g., patching code 204) with second set of hypervisor page tables 116-2 (e.g., kernel code 202).

A dashed-line 412 indicates that patching code 204 corresponds to first set of hypervisor page tables 116-1, which stores one or more hypervisor page tables storing access permissions for accessing guest memory 114. While patching code 204 executes, first set of hypervisor page tables 116-1 is active. Additionally, a dashed-line 414 indicates that kernel code 202 corresponds to second set of hypervisor page tables 116-2, which stores one or more hypervisor page tables storing access permissions for accessing guest memory 114. While kernel code 202 executes, second set of hypervisor page tables 116-2 is active.

At an action 418, hypervisor 108 sets the first range of memory addresses 210, which stores patching code 204, to the write-protected and executable mode in first set of hypervisor page tables 116-1 (see FIG. 3). Accordingly, a portion of kernel 206 (e.g., patching code 204) is write-protected and is not capable of being modified while first set of hypervisor page tables 116-1 is active. Hypervisor 108 may set first range of memory addresses 210 to this write-protected and executable mode by updating the permission bits for one or more memory pages within first range of memory addresses 210 to "-01." Hypervisor 108 may perform this action for each memory page within first range of memory addresses 210 until all memory pages within this first address range are set to the write-protected and executable mode. Accordingly, a memory page having the write-protected mode and executable mode may have its corresponding page table entry store the permission bits "-01."

At an action 420, hypervisor 108 sets the second range of memory addresses 212, which stores kernel code 202, to the writeable mode in first set of hypervisor page tables 116-1. Accordingly, kernel code 202 is modifiable while first set of hypervisor page tables 116-1 is active. Hypervisor 108 may set second range of memory addresses 212 to this writeable mode by updating the permission bits for one or more memory pages within second range of memory addresses 212 to "-10." Hypervisor 108 may perform this action for each memory page within second range of memory addresses 212 until all memory pages within this second address range are set to the writeable mode. Additionally, hypervisor 108 may also set second range of memory addresses 212 to the non-executable mode in first set of hypervisor page tables 116-1 by updating the respective permission bit to the "0" bit value. Accordingly, a memory page having the writeable and non-executable mode may have its corresponding page table entry store the permission bits "-10."

At an action 422, hypervisor 108 sets the first range of memory addresses 210, which stores patching code 204, to the write-protected mode in second set of hypervisor page tables 116-2 (see FIG. 3). Accordingly, patching code 204 is write-protected while second set of hypervisor page tables 116-2 is active. To improve security, patching code 204 may be set to the write-protected mode and kept isolated from kernel code 202. Hypervisor 108 may set first range of memory addresses 210 to this write-protected mode by updating the permission bits for one or more memory pages within first range of memory addresses 210 to "-0-." Hypervisor 108 may perform this action for each memory page within first range of memory addresses 210 until all memory pages within this first range are set to the write-protected mode. Accordingly, a memory page in the write-protected mode may have its corresponding page table entry store the permission bits "-0-." In some examples, hypervisor 108 also sets first range of memory addresses 210 to the non-executable mode.

At an action 424, hypervisor sets the second range of memory addresses 212, which stores kernel code 202, to the write-protected mode in second set of hypervisor page tables 116-2. Accordingly, kernel code 202 is not modifiable while second set of hypervisor page tables 116-2 is active. Hypervisor 108 may set second range of memory addresses 212 to this write-protected mode by updating the permission bits for one or more memory pages within second range of memory addresses 212 to "-0-." Hypervisor 108 may perform this action for each memory page within second range of memory addresses 212 until all memory pages within this second address range are set to the write-protected mode. Accordingly, a memory page having the write-protected mode may have its corresponding page table entry store the permission bits "-0-."

At a later point in time, guest 111 may detect a demand to modify set of memory pages 124. Set of memory pages 124 may be located within second range of memory addresses 212. In an example, set of memory pages 124 stores executable kernel code of the kernel or a set of guest page tables. Set of memory pages 124 may be in the writable mode in first set of hypervisor page tables 116-1 and in the write-protected mode in second set of hypervisor page tables 116-2.

Kernel code 202 may have control of virtual processor 112-1. While kernel code 202 has control of virtual processor 112-1, second set of hypervisor page tables 116-2 is active. In FIG. 4B, at an action 452, guest 111 detects a demand to modify set of memory pages 124. At an action 454, in response to detecting the demand to modify set of memory pages 124, guest 111 sends a request to hypervisor 108 to transfer control to patching code 204. Guest 111 may send the request to hypervisor 108 to transfer control to patching code 204 by invoking a hypercall or other privileged instruction that requests hypervisor 108 to transfer control to patching code 204. Sending the request to hypervisor 108 to transfer control to patching code 204 may include guest 111 executing a command that causes virtual machine 110 to exit and control to be transferred to hypervisor 108. A VM exit marks the point at which a transition is made between the virtual machine currently running and hypervisor 108. Accordingly, in response to guest 111's request to transfer control to patching code 204, control may be transferred to hypervisor 108.

At an action 456, in response to guest 111's request to transfer control to patching code 204, hypervisor 108 switches the active hypervisor page tables from second set of hypervisor page tables 116-2 to first set of hypervisor page tables 116-1, which enables write access to second range of memory addresses 212 (e.g., kernel code 202). First set of hypervisor page tables 116-1 corresponds to patching code 204. In some examples, hypervisor 108 maintains a page table pointer that points to the active hypervisor page table. In an example, in response to detecting a request to transfer control to patching code 204, hypervisor 108 modifies the page table pointer to point to first set of hypervisor page tables 116-1. In response to detecting a request to transfer control to kernel code 202, hypervisor 108 modifies the page table pointer to point to second set of hypervisor page tables 116-2.

At an action 458, in response to guest 111's request to transfer control to patching code 204, hypervisor 108 transfers control to patching code 204. In some examples, hypervisor 108 transfers control from kernel code 202 to patching code 204 in response to detecting the request to transfer control from kernel code 202 to patching code 204. Hypervisor 108 may transfer control to patching code 204 by modifying an instruction pointer to point to the patching code. Hypervisor 108 may then transfer control to patching code 204 by executing a VM entry command that causes virtual machine 110 to re-enter and control to be transferred to guest 111. At this point, the guest 111 re-enters and may proceed with executing the next instructions, which would be patching code 204.

At an action 460, guest 111 executes patching code 204. In this way, hypervisor 108 may cause guest 111 to execute patching code 204. In an example, in response to detecting the request to transfer control to patching code 204, hypervisor 108 switches a particular virtual processor and causes it to start executing patching code 204. Patching code 204 may include various instructions. In an example, patching code 204 includes instructions to identify the request by guest 111 to modify set of memory pages 124. Patching code 204 and kernel code 202 may share a channel (e.g., shared a memory region). Patching code 204 may detect via the channel that the kernel is requesting modification to set of memory pages 124 or has detected a demand to modify set of memory pages 124.

In another example, patching code 204 includes instructions to determine whether the request (or demand) to modify set of memory pages 124 is valid. Patching code 204 may modify set of memory pages 124 in accordance with the request in response to a determination that the request is valid. Patching code 204 may send an error message in response to a determination that the request is not valid. Patching code 204 may receive a range of memory addresses storing the data for which the modification is requested and the data to modify. In an example, the request is a request to insert a trace point in kernel code 202. Kernel code 202 may include special markup at which a trace point may be inserted. Patching code 204 may determine whether the requested insertion location of the trace point is a valid location. For example, patching code 204 may verify the original data at the specified memory address. Kernel 206 may have NOP (No Operation) instructions that specify where trace points may be inserted. In response to a determination that the requested insertion location of the trace point is a valid location, patching code 204 performs the requested modification (e.g., trace point insertion) on behalf of the guest. In response to a determination that the requested insertion location of the trace point is not a valid location, patching code 204 may deny the modification and send an error message.

In another example, the request is a request to execute a jump label. Jump labels are typically known at kernel build time, and page table entries may be pointed to from the appropriate page tables. A data structure may be write-protected and stored at a memory address to which the system can jump. For example, patching code 204 may verify the memory address against the protected data structure. In this example, patching code 204 may determine whether the jump is to a valid memory address. In response to a determination that the requested jump address is to a valid memory address, patching code 204 may proceed to perform the requested modification on behalf of the guest. In response to a determination that the requested jump address is not a valid memory address, patching code 204 may deny the request and send an error message.

In another example, the request is a request to modify a page table entry (e.g., a page table entry in a guest page table). In this example, patching code 204 may determine whether the page table entry in accordance with the modification follows an expected format. In response to a determination that the modification follows the expected format, patching code 204 may proceed to perform the requested modification on behalf of the guest. In response to a determination that the requested modification does not follow the expected format, patching code 204 may deny the request and send an error message.

Patching code 204 includes instructions to send a request to hypervisor 108 to transfer control to kernel code 202 after set of memory pages 124 has been modified. At an action 462, guest 111 sends a request to hypervisor 108 to transfer control to kernel code 202. Guest 111 may send the request to hypervisor 108 to transfer control to kernel code 202 by invoking a hypercall or other privileged instruction that requests hypervisor 108 to transfer control to kernel code 202. Sending the request to hypervisor 108 to transfer control to kernel code 202 may include guest 111 executing a command that causes virtual machine 110 to exit and control to be transferred to hypervisor 108. Accordingly, in response to guest 111's request to transfer control to kernel code 202, control may be transferred to hypervisor 108.

At an action 464, in response to guest 111's request to transfer control to kernel code 202, hypervisor 108 switches the active hypervisor page tables from first set of hypervisor page tables 116-1 to second set of hypervisor page tables 116-2, which corresponds to kernel code 202 and removes write access from second range of memory addresses 212 (e.g., kernel code 202). At an action 466, in response to guest 111's request to transfer control to kernel code 202, hypervisor 108 transfers control to kernel code 202. Hypervisor 108 may transfer control to kernel code 202 by modifying an instruction pointer to point to the kernel code. Hypervisor 108 may then transfer control to virtual machine 110 by executing a VM entry command that causes virtual machine 110 to re-enter and control to be transferred to guest 111. At this point, the guest 111 re-enters and may proceed with executing the next instructions. Guest 111 may then proceed with executing kernel code 202.

In some examples, first set of hypervisor page tables 116-1 and second set of hypervisor page tables 116-2 are selected per processor. In this way, each hypervisor page table of first set of hypervisor page tables 116-1 and second set of hypervisor page tables 116-2 may be used by any number of processors. Other virtual processors included in the same virtual machine may still be able to use second set of hypervisor page tables 116-2 without obtaining write access, so long as they do not re-execute patching code 204. In an example, first set of hypervisor page tables 116-1 and second set of hypervisor page tables 116-2 are created and the appropriate modes (e.g., write access) are set in these hypervisor page tables in response to guest 111 sending hypervisor 108 a message indicating that first range of memory addresses 210 at which patching code 204 is stored is associated with first set of hypervisor page tables 116-1 and further indicating that second range of memory addresses 212 at which kernel code 202 is stored is associated with second set of hypervisor page tables 116-2. In another example, first set of hypervisor page tables 116-1 and second set of hypervisor page tables 116-2 are created and the appropriate modes (e.g., write access) are set in these hypervisor page tables in response to guest 111 detecting a demand to modify set of memory pages 124.

In another example, hypervisor 108 creates and destroys first set of hypervisor page tables 116-1 and second set of hypervisor page tables 116-2 dynamically. For example, hypervisor 108 may detect a request to modify set of memory pages 124. Hypervisor 108 may detect the request to modify set of memory pages 124 by detecting a host page fault. Hypervisor 108 may determine whether the request is from patching code 204. In response to a determination that the request to modify set of memory pages 124 is from patching code 204, hypervisor 108 creates first set of hypervisor page tables 116-1 and second set of hypervisor page tables 116-2 and sets the appropriate modes (e.g., write access) in these hypervisor page tables. In response to a determination that the request to modify set of memory pages 124 is not from patching code 204, hypervisor 108 may deny the request.

As discussed above and further emphasized here, FIGS. 1-3, 4A, and 4B are merely examples, which should not unduly limit the scope of the claims. For example, although in the above examples, hypervisor 108 switches between first set of hypervisor page tables 116-1 and second set of hypervisor page tables 116-2, it should be understood that this is not intended to be limiting. For example, hypervisor memory 109 may include more than two hypervisor page tables that store different memory page access permissions. Additionally, one or more hardware processors may perform this functionality and include instructions to switch between first set of hypervisor page tables 116-1 and second set of hypervisor page tables 116-2. In an example, the instructions to switch between first set of hypervisor page tables 116-1 and second set of hypervisor page tables 116-2 may be built within these sets of page tables. In another example, the switching between first set of hypervisor page tables 116-1 and second set of hypervisor page tables 116-2 may be executed via a processor instruction such as VMFUNC.

Figure 5:
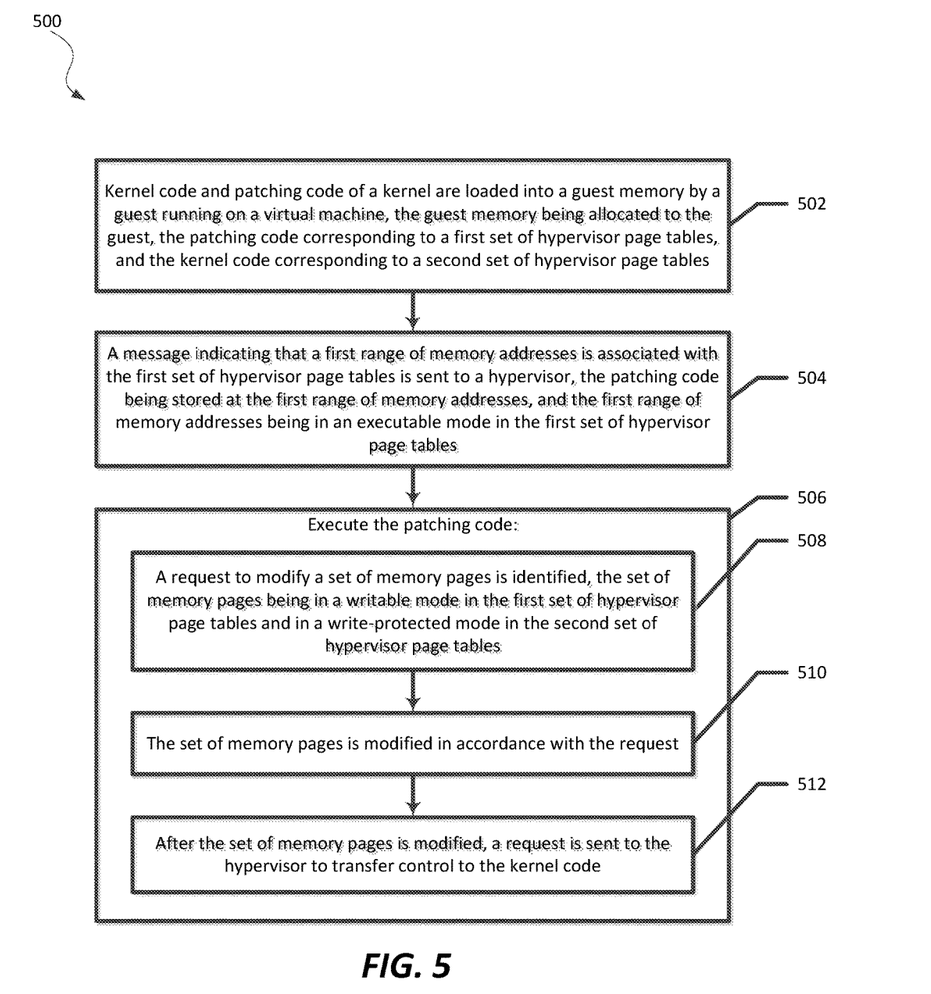
FIG. 5 is an example flowchart illustrating a method of modifying a set of memory pages.

FIG. 5 is an example flowchart illustrating a method 500 of modifying a set of memory pages. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by the system 100 illustrated in FIG. 1. For example, method 500 may be performed on host machine 102. In some examples, the order of the actions described below may also be performed according to alternative orderings. In yet other examples, additional actions may be added and actions that are described may be removed.

Method 500 includes blocks 502, 504, 506, 508, 510, and 512. In a block 502, kernel code and patching code of a kernel are loaded into a guest memory by a guest running on a virtual machine, the guest memory being allocated to the guest, the patching code corresponding to a first set of hypervisor page tables, and the kernel code corresponding to a second set of hypervisor page tables. In an example, guest 111 running on virtual machine 110 loads kernel code 202 and patching code 204 of kernel 206 into guest memory 114 allocated to the guest, patching code 204 corresponding to first set of hypervisor page tables 116-1, and kernel code 202 corresponding to second set of hypervisor page tables 116-2.

In a block 504, a message indicating that a first range of memory addresses is associated with the first set of hypervisor page tables is sent to a hypervisor, the patching code being stored at the first range of memory addresses, and first range of memory addresses being in an executable mode in the first set of hypervisor page tables. In an example, guest 111 sends a message indicating that first range of memory addresses 210 is associated with first set of hypervisor page tables 116-1 to hypervisor 108, patching code 204 being stored at first range of memory addresses 210, and first range of memory addresses 210 being in an executable mode in first set of hypervisor page tables 116-1. First range of memory addresses 210 may be in a non-executable mode or in an executable mode in second set of hypervisor page tables 116-2.

In a block 506, the patching code is executed. Block 506 includes blocks 508, 510, and 512. In block 508, a request to modify a set of memory pages is identified, the set of memory pages being in a writable mode in the first set of hypervisor page tables and in a write-protected mode in the second set of hypervisor page tables. In an example, patching code 204 includes instructions to identify a request to modify set of memory pages 124, which is in the writable mode in first set of hypervisor page tables 116-1 and in the write-protected mode in second set of hypervisor page tables 116-2.

In block 510, the set of memory pages is modified in accordance with the request. In an example, patching code 204 includes instructions to modify the set of memory pages in accordance with the request. In block 512, after the set of memory pages is modified, a request is sent to the hypervisor to transfer control to the kernel code. Patching code 204 includes instructions to send a request to hypervisor 108 to transfer control to kernel code 202. After modifying set of memory pages 124, patching code 204 may send the request to hypervisor 108 to transfer control to kernel code 202.

It is also understood that additional processes may be performed before, during, or after blocks 502-512 discussed above. For example, hypervisor 108 may detect the request to transfer control kernel code 202, and may then perform the reverse actions discussed above. For example, in response to the request to transfer control to kernel code 202, hypervisor 108 may switch control from first set of hypervisor page tables 116-1 to second set of hypervisor page tables 116-2 and transfer control to kernel code 202. In some examples, guest 111 is unaware that hypervisor 108 is maintaining two different sets of hypervisor page tables.

Figure 6:
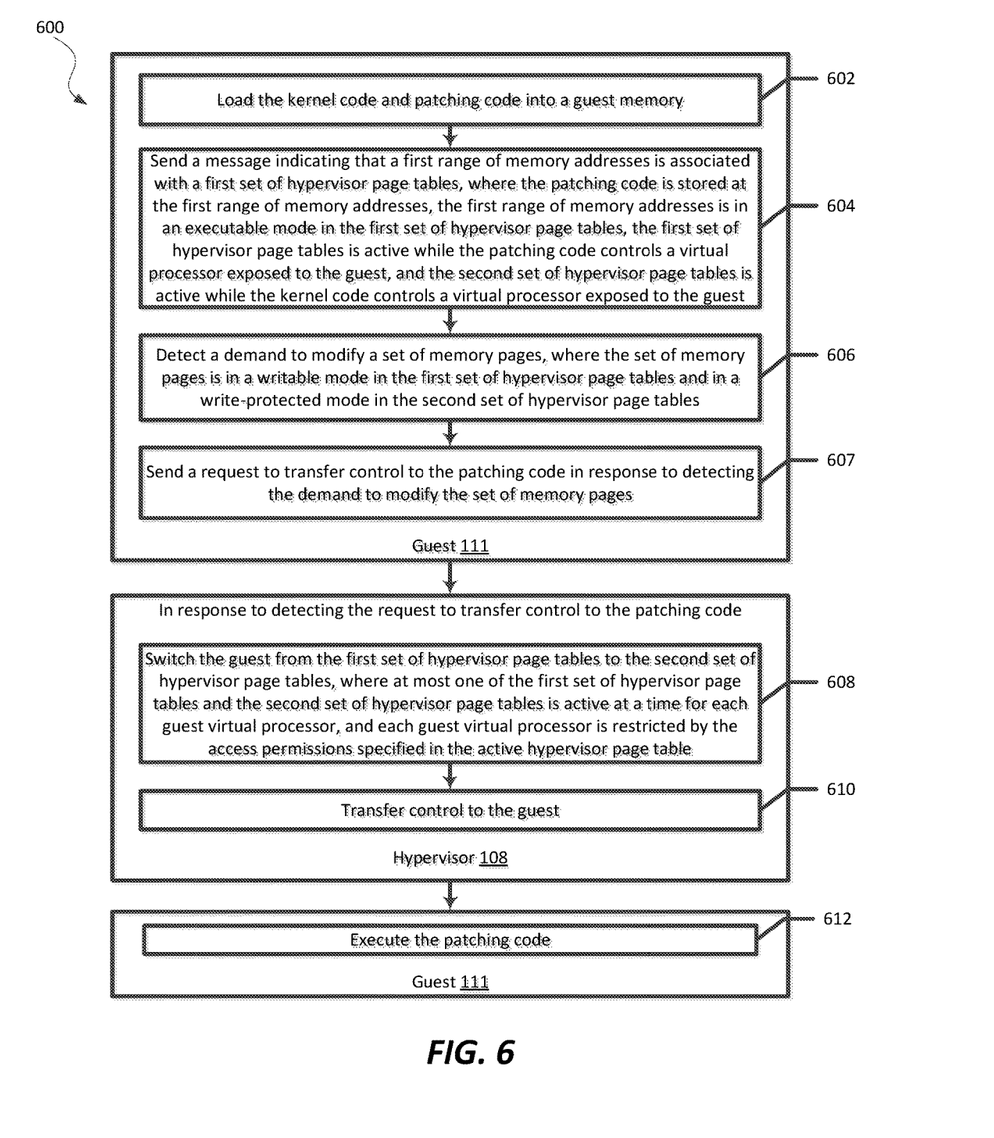
FIG. 6 is an example flowchart illustrating another method of modifying a set of memory pages.

FIG. 6 is an example flowchart illustrating another method 600 of modifying a set of memory pages. Method 600 is not meant to be limiting and may be used in other applications. Method 600 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 600 is performed by the system 100 illustrated in FIG. 1. For example, method 600 may be performed on host machine 102. In some examples, the order of the actions described below may also be performed according to alternative orderings. In yet other examples, additional actions may be added and actions that are described may be removed.

Method 600 includes blocks 602, 604, 606, 607, 608, 610, and 612. In a block 602, guest 111 loads kernel code 202 and patching code 204 into guest memory 114. In a block 604, guest 111 sends a message indicating that first range of memory addresses 210 is associated with first set of hypervisor page tables 116-1, where patching code 204 is stored at first range of memory addresses 210, and first range of memory addresses 210 is in an executable mode in first set of hypervisor page tables 116-1, first set of hypervisor page tables 116-1 is active while patching code 204 controls a virtual processor exposed to guest 111, and second set of hypervisor page tables 116-2 is active while kernel code 202 controls a virtual processor exposed to guest 111. In a block 606, guest 111 detects a demand to modify set of memory pages 124, where the set of memory pages is in a writable mode in first set of hypervisor page tables 116-1 and in a write-protected mode in second set of hypervisor page tables 116-2. In a block 607, guest 111 sends a request to transfer control to patching code 204 in response to detecting the demand to modify set of memory pages 124.

In response to detecting the request to transfer control to patching code 204, hypervisor 108 may execute the actions in blocks 608 and 610. In block 608, hypervisor 108 switches guest 111 from first set of hypervisor page tables 116-1 to second set of hypervisor page tables 116-2, where at most one of the first set of hypervisor page tables 116-1 and second set of hypervisor page tables 116-2 is active at a time for each guest virtual processor, and each guest virtual processor is restricted by the access permissions specified in the active hypervisor page table. In block 610, hypervisor 108 transfers control to guest 111. In a block 612, guest 111 executes patching code 204. It is also understood that additional processes may be performed before, during, or after blocks 602-612 discussed above.

In various implementations, host machine 102 may be a client or a server computing device. The client or server computing device may include one or more processors 104. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Host machine 102 may include a bus or other communication mechanism for communicating information data, signals, and information between various components of computer system. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between host machine 102 and other devices via a communications link to a network. In an example, the transmission is wireless, although other transmission mediums and methods may also be suitable. Processor 104, which may be a micro-controller, digital signal processor (DSP), or other processing component, processes these various signals, such as for display on host machine 102 or transmission to other devices via the communications link. Processor 104 may also control transmission of information, such as cookies or IP addresses, to other devices.

Components of host machine 102 may also include a system memory component (e.g., RAM), a static storage component (e.g., ROM), and/or a disk drive. Host machine 102 performs specific operations by processor 104 and other components by executing one or more sequences of instructions contained in the system memory component (e.g., memory 106). Logic may be encoded in a computer readable medium, which may refer to any medium that participates in providing instructions to processor 104 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., process flows 400,450, method 500, and/or method 600) to practice the present disclosure may be performed by host machine 102. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of modifying a set of memory pages, comprising:
    loading, by a guest running on a virtual machine, kernel code and patching code of a kernel into a guest memory allocated to the guest, the patching code corresponding to a first set of hypervisor page tables, and the kernel code corresponding to a second set of hypervisor page tables;
    sending, by the guest, a message indicating that a first range of memory addresses is associated with the first set of hypervisor page tables to a hypervisor, the patching code being stored at the first range of memory addresses, and the first range of memory addresses being in an executable mode in the first set of hypervisor page tables; and
    executing the patching code, wherein executing the patching code includes:
        modifying a set of memory pages in accordance with a request to modify the set of memory pages, the set of memory pages being in a writable mode in the first set of hypervisor page tables and in a write-protected mode in the second set of hypervisor page tables; and
        after modifying the set of memory pages, sending a request to the hypervisor to transfer control to the kernel code.

2. The method of claim 1, wherein at most one of the first set of hypervisor page tables and the second set of hypervisor page tables is active at a time, and the guest is restricted by the access permissions specified in the active hypervisor page table.

3. The method of claim 2, wherein in response to control of a virtual processor being transferred to the patching code, the first set of hypervisor page tables is active, and in response to control of a virtual processor being transferred to the kernel code, the second set of hypervisor page tables is active, and wherein the virtual processor is allocated to the guest by the hypervisor.

4. The method of claim 1, further comprising:
detecting, by the guest, a demand to modify the set of memory pages; and
in response to detecting the demand, sending a request to the hypervisor to transfer control to the patching code.

5. The method of claim 4, wherein sending the request to the hypervisor to transfer control to the patching code includes invoking, by the guest, a hypercall that causes the hypervisor to transfer control to the patching code.

6. The method of claim 1, wherein execution of the patching code further comprises:
determining whether the demand to modify the set of memory pages is valid, wherein modifying the set of memory pages includes modifying the set in response to a determination that the demand is valid.

7. The method of claim 1, further comprising:
detecting, by the hypervisor, the request to modify the set of memory pages;
determining whether the request to modify the set of memory pages is from the patching code;
in response to a determination that the request to modify the set of memory pages is from the patching code, transferring control from the kernel code to the patching code; and
in response to a determination that the request to modify the set of memory pages is not from the patching code, denying the request to modify the set of memory pages.

8. The method of claim 1, wherein the set of memory pages stores executable kernel code of the kernel.

9. The method of claim 1, wherein the set of memory pages stores a set of guest page tables.

10. The method of claim 1, further comprising:
sending, by the guest, a message indicating that the kernel code is stored at a second range of memory addresses to the hypervisor, the second range of memory addresses being in the writable mode in the first set of hypervisor page tables and in the write-protected mode in the second set of hypervisor page tables, wherein the set of memory pages is located within the second range of memory addresses.

11. The method of claim 10, further comprising:
receiving, by the hypervisor, the first and second ranges of memory addresses;
setting the first range of memory addresses to the executable mode in the first set of hypervisor page tables;
setting the second range of memory addresses to the writeable mode in the first set of hypervisor page tables; and
setting the second range of memory addresses to the write-protected mode in the second set of hypervisor page tables.

12. A system for modifying a set of memory pages, comprising:
a guest memory storing kernel code and patching code of a kernel, wherein the patching code is stored at a first range of memory addresses;
a hypervisor memory storing first and second sets of hypervisor page tables;
a guest that loads the kernel code and patching code into the guest memory, sends a message indicating that a first range of memory addresses is associated with the first set of hypervisor page tables, detects a demand to modify a set of memory pages, sends a request to transfer control to the patching code in response to detecting the demand, and executes the patching code, wherein the first range of memory addresses is in an executable mode in the first set of hypervisor page tables, wherein at most one of the first set of hypervisor page tables and the second set of hypervisor page tables is active at a time, and the guest is restricted by the access permissions specified in the active hypervisor page table, and wherein the first set of hypervisor page tables is active while the patching code controls a first virtual processor exposed to the guest, and the second set of hypervisor page tables is active while the kernel code controls a second virtual processor exposed to the guest; and
a hypervisor that receives a message indicating that the first range of memory addresses is associated with the first set of hypervisor page tables and that in response to detecting the request to transfer control to the patching code, switches the guest from the first set of hypervisor page tables to the second set of hypervisor page tables and transfers control to the guest, wherein the set of memory pages is in a writable mode in the first set of hypervisor page tables and in a write-protected mode in the second set of hypervisor page tables.

13. The system of claim 12, wherein when the guest executes the patching code, the guest identifies a request to modify the set of memory pages, modifies the set of memory pages in accordance with the request to modify, and after the set of memory pages has been modified, sends a request to the hypervisor to transfer control to the kernel code.

14. The system of claim 12, wherein the first range of memory addresses is in a non-executable mode in the second set of hypervisor page tables.

15. The system of claim 12, wherein the hypervisor transfers control to the guest by modifying an instruction pointer to point to the patching code, and wherein the guest re-enters and executes the patching code.

16. The system of claim 12, wherein the hypervisor maintains a page table pointer that points to the active hypervisor page table.

17. The system of claim 16, wherein in response to detecting the request to transfer control to the patching code, the hypervisor modifies the page table pointer to point to the first set of hypervisor page tables.

18. The system of claim 17, wherein in response to detecting the request to transfer control to the kernel code, the hypervisor modifies the page table pointer to point to the second set of hypervisor page tables.

19. A machine-readable medium comprising a plurality of machine-readable instructions that when executed by one or more processors is adapted to cause the one or more processors to perform a method comprising:
loading, by a guest running on a virtual machine, kernel code and patching code of a kernel into a guest memory allocated to the guest, the patching code corresponding to a first set of hypervisor page tables, and the kernel code corresponding to a second set of hypervisor page tables;
sending, by the guest, a message indicating that a first range of memory addresses is associated with the first set of hypervisor page tables to a hypervisor, the patching code being stored at the first range of memory addresses, and the first range of memory addresses being in an executable mode in the first set of hypervisor page tables; and executing, by the guest, the patching code, wherein execution of the patching code includes:

modifying a set of memory pages in accordance with a request to modify the set of memory pages, the set of memory pages being in a writable mode in the first set of hypervisor page tables and in a write-protected mode in the second set of hypervisor page tables; and after modifying the set of memory pages, sending a request to the hypervisor to transfer control to the kernel code.

20. The machine-readable medium of claim 19, wherein at most one of the first set of hypervisor page tables and the second set of hypervisor page tables is active at a time, and the guest is restricted by the access permissions specified in the active hypervisor page table.

* * * * *